UNITED STATES PATENT OFFICE.

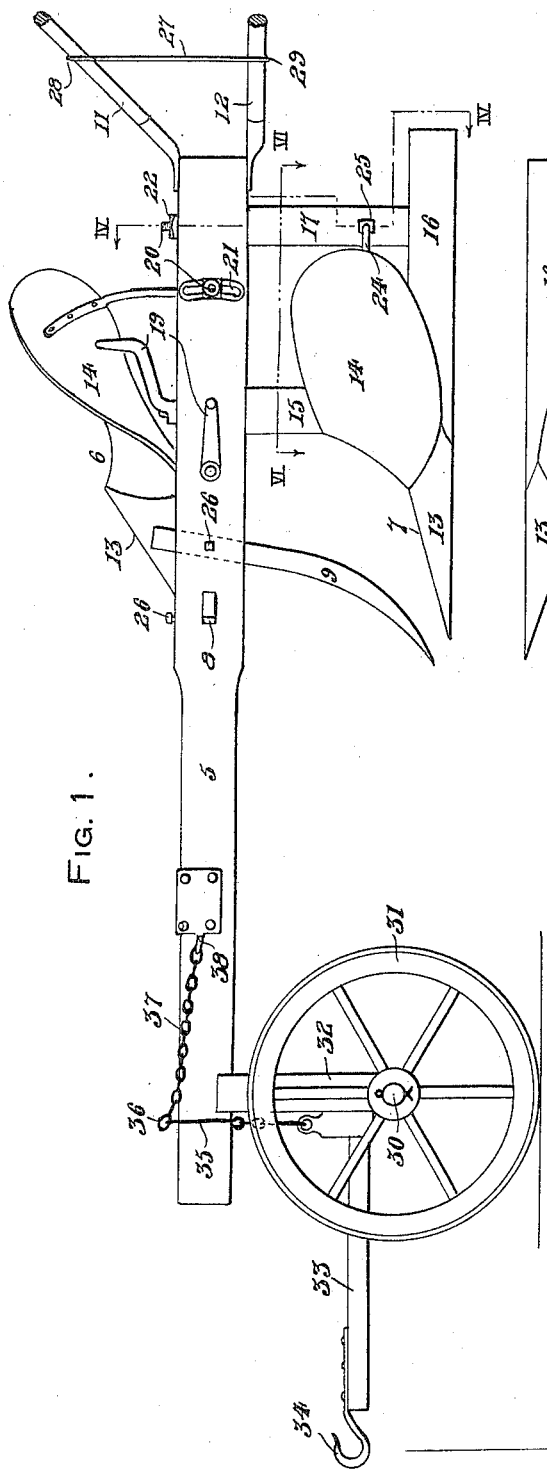

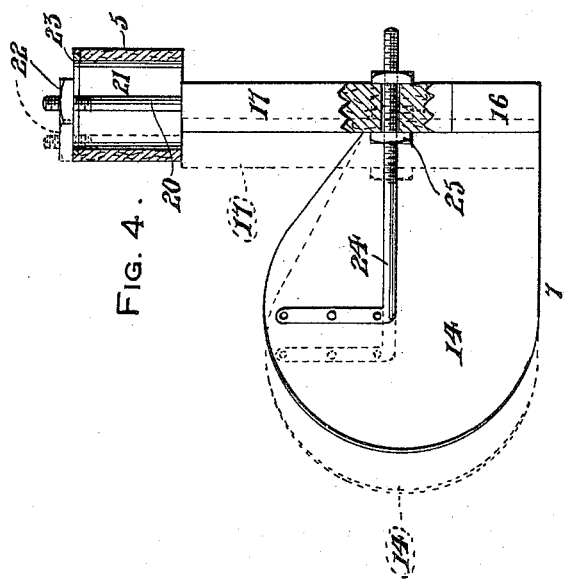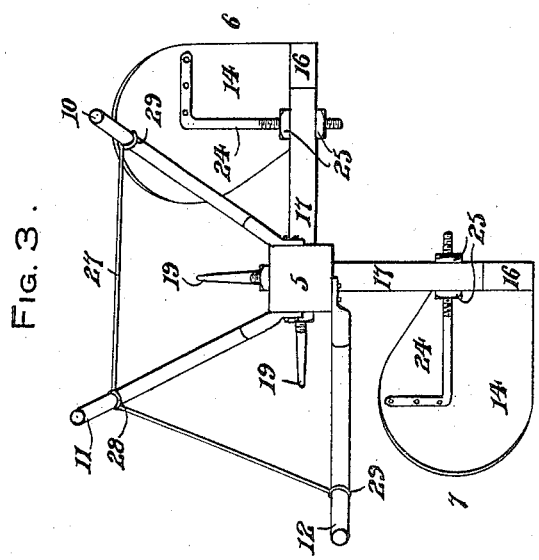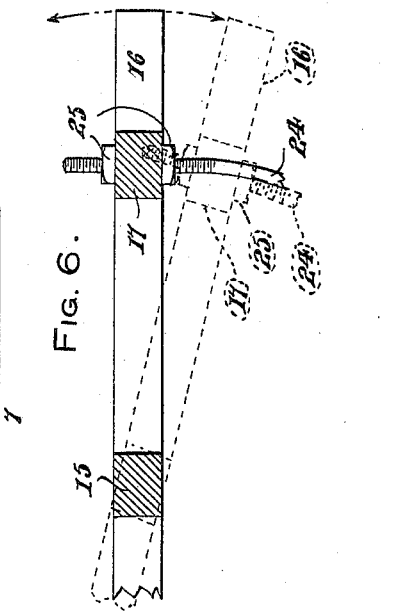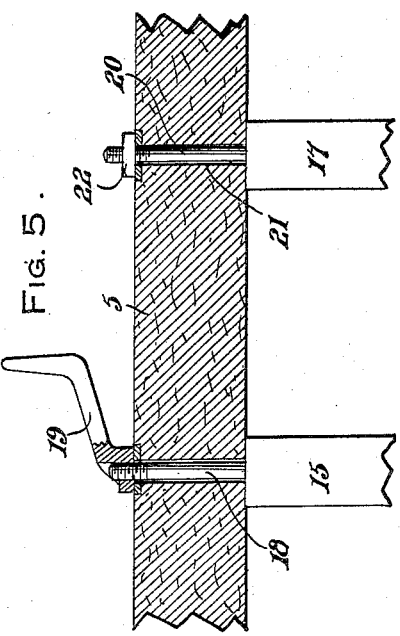

FRANK PIRC, OF MARINETTE, WISCONSIN.

REVERSIBLE PLOW.

1,400,768.  Specification of Letters Patent.  Patented Dec. 20, 1921.

Application filed November 18, 1920. Serial No. 424,960.

*To all whom it may concern:*

Be it known that I, FRANK PIRC, a citizen of Jugo-Slavia, residing at Marinette, in the county of Marinette and State of Wisconsin, have invented certain new and useful Improvements in Reversible Plows, of which the following is a specification.

This invention relates to certain new and useful improvements in reversible plows including right and left hand plow members or earth working elements disposed at an angle to one another and affixed to the same beam which can be turned on its own axis to bring either plow member into operative position while the other is carried inoperatively above the ground.

The principal object of the invention is to provide a simple, practical and efficient implement of the above character, which will be conveniently adapted for back and forth plowing, on small farms.

A further object of the invention is to so construct the plow as to enable its plow members to be turned angularly relative to the longitudinal axis of the beam so as to vary the width of furrow to be formed.

The invention consists of the construction hereinafter described with reference to the accompanying drawings and particularly pointed out in the claim annexed to this specification.

In said drawings,

Figure 1 is a side elevational view of an implement embodying this invention,

Fig. 2 is a top plan view of the device shown in Fig. 1,

Fig. 3 is a rear elevational view of the device shown in Fig. 1 with parts removed.

Fig. 4 is an enlarged sectional view taken upon line IV—IV of Fig. 1,

Fig. 5 is a similar view taken upon line V—V of Fig. 2, and

Fig. 6 is a horizontal sectional view taken upon line VI—VI of Fig. 1.

Referring in detail to the several views, the present invention includes a beam 5 having individual right and left hand plows 6 and 7 affixed thereto, together with knives or colters 8 and 9 in advance of the respective plows; and three handle bars 10, 11 and 12, two of which serve as the handles for either plow.

The plows are disposed with their land sides at substantially right angles to one another, and the lateral or right and left hand handle bars are arranged approximately at a similar angle, the middle handle bar 11 being substantially midway between the other two and also bisecting the angle between the plows; so that the right hand handle bar rises from the land side of the left hand plow and the left hand handle bar rises from the corresponding side of the right hand plow.

The individual construction of each plow is as follows:

It comprises a share 13 and mold board 14 attached to a standard 15, the upper end of which is pivotally secured in an opening therefor in the beam. Said standard has a trailing foot 16, which is or may be formed to provide a landside extending rearwardly of the land side face of the share. The heel of the foot 16 is connected to the rear end of the beam by a post 17. Each plow standard 15 has its upper end reduced to form a bolt like shank 18 projecting through the beam and having a wing nut threaded onto the shank 18 to securely hold the standard 15 against turning or to be loosened for permitting turning on said standard for a purpose which will presently become apparent.

The upper end of each post 17 is also reduced to form a bolt-like shank 20 which extends through an arcuate slot 21 provided in the beam 5 concentric with the shank 18, and a nut 22 is threaded upon the end of the shank 20 so as to bear upon the wear plate 23 which is preferably countersunk in the upper face of the beam and provided with an arcuate slot communicating with the slot of the beam. The mold board 14 of each plow member is connected to its respective post 17 by an angular brace rod 24 which is rigidly fastened to the mold-board at one end and extends laterally through the post 17, nuts 25 being adjustably threaded upon the rod 24 at opposite sides of the post 17 in the usual manner for permitting adjustment of the mold board toward or away from the post 17 and for maintaining it in adjusted position.

It will be apparent that when the nuts 19 and 22 are loosened; the entire plow member or elements 13, 14, 15, 16 and 17 may be swung bodily about the shank 18 as a pivot so as to position said plow member at any desired angular relation to the longitudinal axis of the beam for making the desired width of furrow. Such adjustment of the plow member will also, when adjusted to the dotted line position of Fig. 6, tend to provide a side draft for keeping the plow toward a hill side or embankment. When the desired adjustment has been made the nuts 19 and 22 are again threaded onto the shanks 18 and 20 and the adjustment thereby maintained.

The colters 9 are arranged with their shanks inserted through holes provided in the beam and are retained rigidly in position by any suitable fastening means such as set screws 26, and the three handle bars are braced together by an angular brace bar 27 which is provided with an eye 28 securely embracing the middle handle bar and end eyes 29 similarly embracing the outer handle bars. The inner ends of the handle bars are preferably securely bolted to the sides and under faces of the beam 5 as clearly shown in Fig. 3.

The front end of the beam is supported upon an axle 30 by guiding and supporting wheels 31, which axle is provided with a bolster 32 having a central groove in its upper edge within which the beam rests. From the bolster 32 there extends a short tongue 33 having at its front end a hook 34 for attachment of the whiffle tree for hitching the team to the implement. In constructions heretofore provided, the hook 34 has been pivoted and laterally adjustable for the purpose of landing the working plow or regulating the width of the furrow. I have found that this is undesirable and that better results can be obtained by mounting the plow member *per se* for lateral swinging movement about the shank 18 as hereinbefore described. The beam is attached to the axle and it is placed in the usual manner as shown in Figs. 1 and 2 by a stirrup 35 which is connected by links to the inner end of the tongue 33 and which straddles the beam. The stirrup is attached at its top as at 36 to a draft chain 37, the rear end of which engages the hook 38 which is rigidly fastened on the beam rearwardly of the truck and forwardly of the colter 9. Thus the front end of the beam simply rests upon the bolster and axle, and the implement is hauled by the wheels through the draft chain 37. By lengthening or shortening said chain, and thereby correspondingly depressing or limiting the front end of the beam, the depth of the furow may be regulated.

It will be apparent that the implement is reversed from the right hand to the left hand plow member, or vice versa, by simply turning the beam on its own axis. Viewing Fig. 3, it will be seen that by turning the beam through an angle of 90° to the right, the right hand plow will be brought into operative position, and the handles 11 and 12 will be brought up to take the place of the handles 10 and 11.

A simple, practical and efficient implement of the character described is thus provided for use on ordinary farms by means of which the soil may be tilled by plowing back and forth, one furrow adjacent to another.

What is claimed as new is:—

In a plow, the combination of a beam, an earth working plow member, an upright standard rigid with and extending upwardly from said plow member, said standard having its upper end pivoted in the beam for permitting axial turning of said standard on a vertical axis whereby lateral swinging movement of said plow member may be had, a land side rigid with and extending rearwardly from said standard, an upright post rigidly secured upon the heel of said land side and having a reduced upper end portion in the form of a bolt, said post engaging the under surface of said beam, said beam having an arcuate slot concentric with the axis of the standard and through which said bolt extends, and a nut threaded upon the upper end of said bolt and adapted to be screwed against the upper face of the beam for retaining the plow member, standard and post in laterally swung adjusted positions.

In testimony whereof I affix my signature.

FRANK PIRC.